US012570126B2

(12) United States Patent
Hu et al.

(10) Patent No.: US 12,570,126 B2
(45) Date of Patent: Mar. 10, 2026

(54) HEAT PUMP AIR CONDITIONING SYSTEM AND VEHICLE

(71) Applicants:Zhejiang Geely Holding Group Co., LTD., Zhejiang (CN); ZHEJIANG LIANKONG TECHNOLOGIES CO., LTD, Zhejiang (CN)

(72) Inventors: Lei Hu, Zhejiang (CN); Chengjia Zhao, Zhejiang (CN); Yibo Qiang, Zhejiang (CN); Songyong Xia, Zhejiang (CN); Yehong Lu, Zhejiang (CN); Zhenrong Liu, Zhejiang (CN)

(73) Assignees: Zhejiang Geely Holding Group Co., LTD., Zhejiang (CN); ZHEJIANG LIANKONG TECHNOLOGIES CO., LTD, Zhejiang (CN)

( * ) Notice: Subject to any disclaimer, the term of this patent is extended or adjusted under 35 U.S.C. 154(b) by 112 days.

(21) Appl. No.: 18/696,990

(22) PCT Filed: Jun. 22, 2022

(86) PCT No.: PCT/CN2022/100581
§ 371 (c)(1),
(2) Date: Mar. 28, 2024

(87) PCT Pub. No.: WO2023/050919
PCT Pub. Date: Apr. 6, 2023

(65) Prior Publication Data
US 2024/0399826 A1      Dec. 5, 2024

(30) Foreign Application Priority Data
Sep. 29, 2021      (CN) .......................... 202111147607.9

(51) Int. Cl.
*B60H 1/00*            (2006.01)

(52) U.S. Cl.
CPC ................................ *B60H 1/00907* (2013.01)

(58) Field of Classification Search
CPC .................................................... B60H 1/00907
See application file for complete search history.

(56) References Cited

U.S. PATENT DOCUMENTS

| | | | |
|---|---|---|---|
| 6,516,623 | B1 | 2/2003 | Collier |
| 2012/0279691 | A1 | 11/2012 | Seybold et al. |
| 2013/0139528 | A1 | 6/2013 | Katayama et al. |

FOREIGN PATENT DOCUMENTS

| | | |
|---|---|---|
| CN | 105509368 | 4/2016 |
| CN | 107782020 | 3/2018 |

(Continued)

OTHER PUBLICATIONS

"Search Report of Europe Counterpart Application", issued on Jan. 8, 2025, p. 1-p. 7.

(Continued)

*Primary Examiner* — Jonathan Bradford
(74) *Attorney, Agent, or Firm* — JCIPRNET

(57) ABSTRACT

A heat pump air conditioning system includes a compressor, a heat pump module, and an air conditioning unit, where the air conditioning unit includes an evaporator and an internal condenser, the heat pump module includes multiple air conditioning components, and a surface of the heat pump module is provided with multiple heat exchange interfaces connected to the air conditioning components, and the compressor, the evaporator, or the internal condenser is connected to the heat pump module through the heat exchange interfaces. The present application achieves the modularity of the heat pump air conditioning system, which is conducive to reducing the difficulty in installing and (Continued)

high-pressure refrigerant ————▶ low-pressure refrigerant ◀————

242
241 arranging the heat pump air conditioning system. In addition, a vehicle using the heat pump air conditioning system is also referred to.

18 Claims, 11 Drawing Sheets

(56) References Cited

FOREIGN PATENT DOCUMENTS

| | | |
|---|---|---|
| CN | 207697428 | 8/2018 |
| CN | 108489162 | 9/2018 |
| CN | 110182017 | 8/2019 |
| CN | 110654199 | 1/2020 |
| CN | 111156730 | 5/2020 |
| CN | 212124785 | 12/2020 |
| CN | 112428777 | 3/2021 |
| CN | 112477549 | 3/2021 |
| CN | 112543709 | 3/2021 |
| CN | 113212104 | 8/2021 |
| CN | 113212105 | 8/2021 |
| CN | 113829833 | 12/2021 |
| JP | 2001328417 | 11/2001 |
| KR | 20200066432 | 6/2020 |
| KR | 20200139094 | 12/2020 |
| WO | 2016163771 | 10/2016 |
| WO | 2019021710 | 1/2019 |
| WO | 2021049435 | 3/2021 |

OTHER PUBLICATIONS

"International Search Report (Form PCT/ISA/210) of PCT/CN2022/100581," mailed on Sep. 26, 2022, with English translation thereof, pp. 1-4.

"Written Opinion of the International Searching Authority (Form PCT/ISA/237) of PCT/CN2022/100581," mailed on Sep. 26, 2022, with English translation thereof, pp. 1-6.

"Office Action of China Counterpart Application", issued on Jan. 6, 2024, with English translation thereof, p. 1-p. 9.

high-pressure refrigerant low-pressure refrigerant

242

241

1

HEAT PUMP AIR CONDITIONING SYSTEM AND VEHICLE

CROSS-REFERENCE TO RELATED APPLICATION

This application is National Stage of International Application No. PCT/CN2022/100581, filed on Jun. 22, 2022, which claims priority to Chinese Patent Application No. 202111147607.9, filed with the China National Intellectual Property Administration on Sep. 29, 2021 and titled "HEAT PUMP AIR CONDITIONING SYSTEM AND VEHICLE", both of the applications are incorporated herein by reference in their entireties.

TECHNICAL FIELD

The present application relates to manufacturing technologies of vehicle parts, in particular to a heat pump air conditioning system and a vehicle.

BACKGROUND

With the growing maturity of the new energy vehicle industry and the encouragement and support of national policies, new energy vehicles are increasingly sought after by people. In the new energy vehicle, the air conditioning system is an important constituent part, currently, the heat pump air conditioning system is widely used in the new energy vehicle due to advantages such as reversible refrigeration cycle, energy saving and high efficiency.

In the technical solutions of the related technologies, the arrangement of the air conditioning system of the new energy vehicle mainly draws lessons from the arrangement of the air conditioning system of the traditional fuel vehicle, and the parts and pipelines of the air conditioning system are scattered inside the vehicle body.

However, since the number of parts in the heat pump air conditioning system of the new energy vehicle is greater than that in the air conditioning system of the traditional fuel vehicle, there is the problem of greater difficulty in installing and arranging the heat pump air conditioning system when assembling the new energy vehicle.

SUMMARY

In order to overcome the aforementioned defects in the related technologies, a purpose of the present application is to provide a heat pump air conditioning system and a vehicle, so as to reduce the difficulty of installing and arranging the heat pump air conditioning system.

The present application provides a heat pump air conditioning system, including a compressor, a heat pump module, and an air conditioning unit, where the air conditioning unit includes an evaporator and an internal condenser, the heat pump module includes multiple air conditioning components, and a surface of the heat pump module is provided with multiple heat exchange interfaces connected to the air conditioning components, and the compressor, the evaporator, or the internal condenser is connected to the heat pump module through the heat exchange interface.

The heat pump air conditioning system as described above, in an implementation, the air conditioning components include at least one of an external condenser, a battery cooler, a gas-liquid separator, a coaxial tube, an expansion valve, a one-way valve and a two-way valve, the coaxial tube includes a first pipeline and a second pipeline set in a coaxial position, and the external condenser is a water-cooled condenser; and the surface of the heat pump module is provided with a first heat exchange interface, a second heat exchange interface, a third heat exchange interface, a fourth heat exchange interface, a fifth heat exchange interface and a sixth heat exchange interface;

an exhaust end of the compressor is connected to the first heat exchange interface, the first heat exchange interface is connected to a first end of the external condenser through a first two-way valve, a second end of the external condenser is connected to a first end of the first pipeline of the coaxial tube through a first one-way valve;

the first heat exchange interface is further connected to the second heat exchange interface through a second two-way valve, the second heat exchange interface is connected to an inlet of the internal condenser, an outlet of the internal condenser is connected to the third heat exchange interface, and the third heat exchange interface is connected to the first end of the first pipeline of the coaxial tube through a second one-way valve;

a second end of the first pipeline of the coaxial tube is connected to the fourth heat exchange interface through a first expansion valve, the fourth heat exchange interface is connected to an inlet of the evaporator, an outlet of the evaporator is connected to the fifth heat exchange interface, and the fifth heat exchange interface is connected to a first end of the gas-liquid separator;

the second end of the first pipeline of the coaxial tube is further connected to a first end of the battery cooler through a second expansion valve, and a second end of the battery cooler is connected to the first end of the gas-liquid separator;

a second end of the gas-liquid separator is connected to a second end of the second pipeline of the coaxial tube, a first end of the second pipeline of the coaxial tube is connected to the sixth heat exchange interface, and the sixth heat exchange interface is connected to a suction end of the compressor.

The heat pump air conditioning system as described above, in an implementation, when the heat pump air conditioning system is in a first working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

The heat pump air conditioning system as described above, in an implementation, when the heat pump air conditioning system is in a second working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

The heat pump air conditioning system as described above, in an implementation, when the heat pump air conditioning system is in a third working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

The heat pump air conditioning system as described above, in an implementation, when the heat pump air conditioning system is in a fourth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

The heat pump air conditioning system as described above, in an implementation, when the heat pump air conditioning system is in a fifth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

The heat pump air conditioning system as described above, in an implementation, when the heat pump air conditioning system is in a sixth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

The heat pump air conditioning system as described above, in an implementation, when the heat pump air conditioning system is in a seventh working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

The heat pump air conditioning system as described above, in an implementation, when the heat pump air conditioning system is in an eighth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

The heat pump air conditioning system as described above, in an implementation, when the heat pump air conditioning system is in a ninth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

Another embodiment of the present application provides a vehicle, including any one of the heat pump air conditioning system as described above.

The present application provides a heat pump air conditioning system and a vehicle, the heat pump air conditioning system includes a compressor, a heat pump module, and an air conditioning unit, where the air conditioning unit includes an evaporator and an internal condenser, the heat pump module includes multiple air conditioning components, and a surface of the heat pump module is provided with multiple heat exchange interfaces connected to the air conditioning components, and the compressor, the evaporator, or the internal condenser is connected to the heat pump module through the heat exchange interfaces. By integrating multiple air conditioning components within a heat pump module, and providing heat exchange interfaces on a surface of the heat pump module for connecting to a compressor, an evaporator, or an internal condenser, the present application achieves the modularity of the heat pump air conditioning system, which is conducive to reducing the difficulty in installing and arranging the heat pump air conditioning system.

BRIEF DESCRIPTION OF THE DRAWINGS

In order to more clearly illustrate the technical solutions in embodiments of the present application or the related technology, the following will briefly introduce the accompanying drawings that need to be used in the description of the embodiments or the related technology, and it will be obvious that the accompanying drawings in the following description are some of the embodiments of the present application, and that for those of ordinary skilled in the art, other accompanying drawings can be obtained based on these drawings without putting forth any creative labor.

DETAILED DESCRIPTION OF THE EMBODIMENTS

In the technical solutions of the related technologies, the arrangement of the air conditioning system of the new energy vehicle mainly draws lessons from the arrangement of the air conditioning system of the traditional fuel vehicle, and the parts and pipelines of the air conditioning system are scattered inside the vehicle body. However, since the number of parts in the heat pump air conditioning system of the new energy vehicle is greater than that in the air conditioning system of the traditional fuel vehicle, and the scattered arrangement lacks effective and unified interfaces, there is the problem of greater difficulty in installing and arranging the heat pump air conditioning system when assembling the new energy vehicle.

In view of the above, the present application aims to provide a heat pump air conditioning system and a vehicle, by integrating multiple air conditioning components of the heat pump air conditioning system within a heat pump module, and providing heat exchange interfaces on a surface of the heat pump module for connecting to a compressor, an evaporator, or an internal condenser, thereby achieving the modularity of the heat pump air conditioning system, which is conducive to reducing the difficulty in installing and arranging the heat pump air conditioning system. The present application further provides a vehicle including the heat pump air conditioning system.

In order to make the purpose, technical solutions and advantages of the embodiments of the present application clearer, the technical solutions in the embodiments of the present application will be described clearly and completely in the following in conjunction with the accompanying drawings in the embodiments of the present application, and it is clear that the described embodiments are a part of the embodiments of the present application and not all of the embodiments.

Based on the embodiments in this application, all other embodiments obtained by those of ordinary skilled in the art without making creative labor fall within the scope of protection of the present application. In the absence of conflict, the following embodiments and features in the embodiments may be combined with each other.

Embodiment 1

Figure 1:
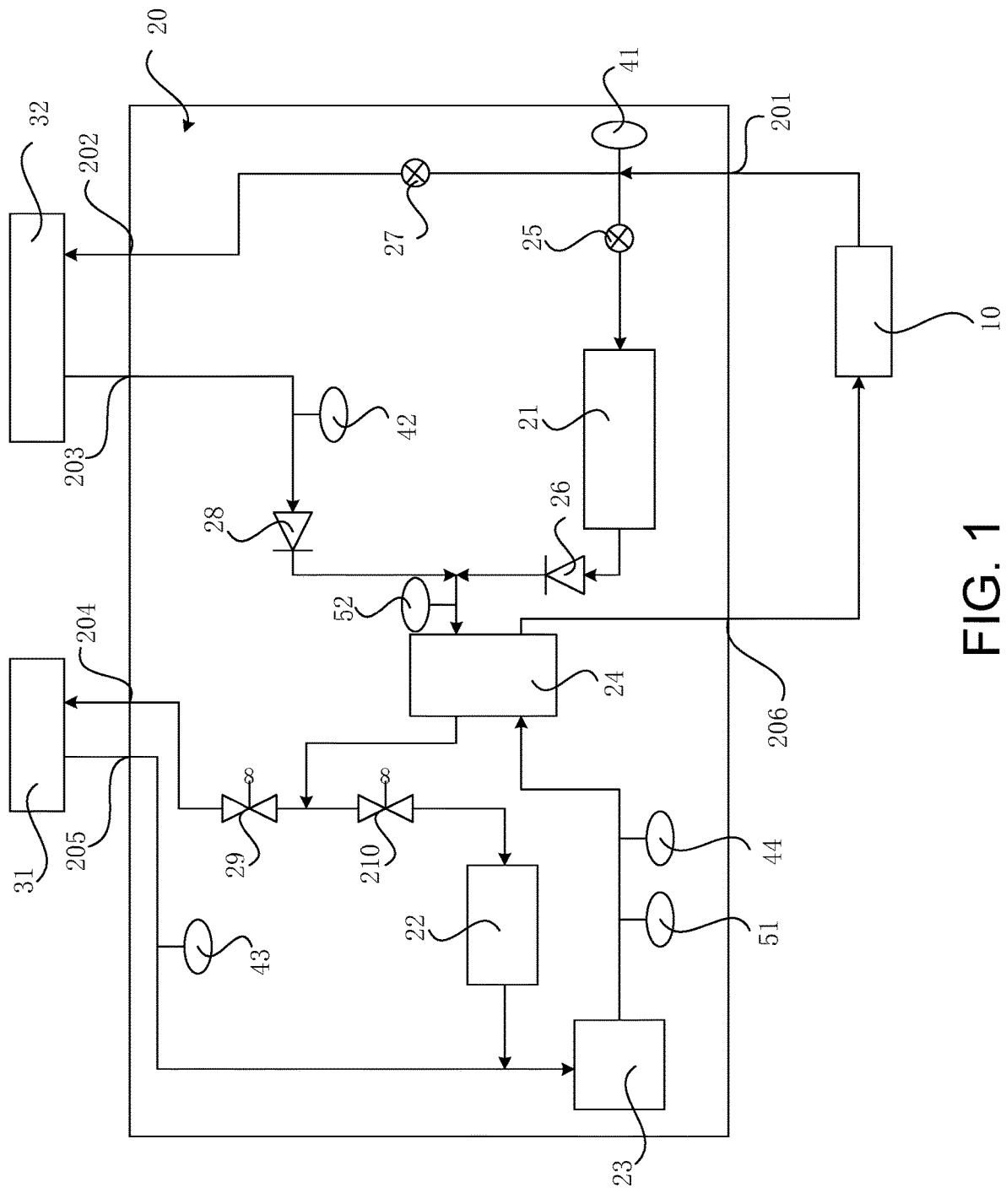
FIG. 1 is a structural simplified diagram of a heat pump air conditioning system provided by an embodiment of the present application.

FIG. 1 is a structural simplified diagram of a heat pump air conditioning system provided by an embodiment of the present application.

Referring to FIG. 1, the present application provides a heat pump air conditioning system, including a compressor 10, a heat pump module 20, and an air conditioning unit, where the air conditioning unit includes an evaporator 31 and an internal condenser 32, the heat pump module 20 includes multiple air conditioning components, and a surface of the heat pump module 20 is provided with multiple heat exchange interfaces connected to the air conditioning components, and the compressor 10, the evaporator 31, or the internal condenser 32 is connected to the heat pump module 20 through the heat exchange interface.

Specifically, in this embodiment, the heat pump air conditioning system is arranged in a space between a vehicle body and a chassis, the compressor 10, the heat pump module 20, and the air conditioning unit are all independently set and connected into a whole through pipelines to achieve heat exchange. The heat pump module 20 has a housing, the shape of the housing may be set as needed to facilitate to place it inside the vehicle body. The housing may be a metal housing or rigid plastic housing, etc. The interior of the heat pump module 20 is integrated with multiple air conditioning components, which are connected through pipelines inside the heat pump module 20 to form a loop for refrigerant circulation. The surface of the heat pump module 20 is also provided with multiple heat exchange interfaces, as interfaces of the compressor 10, the evaporator 31, and the internal condenser 32 are all fixed interfaces, the heat exchange interfaces can also be set as fixed structures, so as to facilitate installation.

By integrating multiple air conditioning components within the heat pump module 20, and providing heat exchange interfaces on the surface of the heat pump module 20 for connecting to the compressor 10, the evaporator 31, or the internal condenser 32, the present application achieves the modularity of the heat pump air conditioning system, and makes the interfaces within the heat pump air conditioning system uniform, which is conducive to reducing the difficulty in installing and arranging the heat pump air conditioning system.

Figure 2:
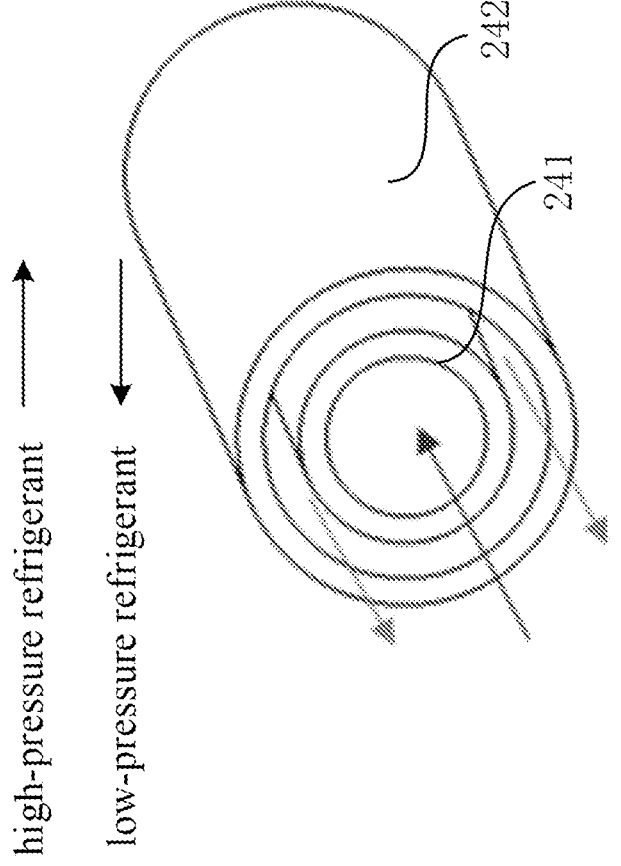
FIG. 2 is a structural simplified diagram of a coaxial tube provided by an embodiment of the present application.

FIG. 2 is a structural simplified diagram of a coaxial tube provided by an embodiment of the present application. Referring to FIGS. 1 to 2, in this embodiment, the air conditioning components include at least one of an external condenser 21, a battery cooler 22, a gas-liquid separator 23, a coaxial tube 24, an expansion valve, a one-way valve and a two-way valve. The structure of the coaxial tube 24 is shown in FIG. 2, the coaxial tube 24 includes a first pipeline 241 and a second pipeline 242 set in a coaxial position, the first pipeline 241 is located inside the second pipeline 242, the first pipeline 241 is used for the circulation of high-pressure refrigerant, and the second pipeline 242 is used for the circulation of low-pressure refrigerant, and the flow directions of the refrigerant in the first pipeline 241 and the second pipeline 242 are opposite, so that one pipeline can be used to achieve bidirectional flow of refrigerant, which is conducive to the arrangement of pipelines, and also effectively improves the refrigerating capacity and heating capacity of the heat pump air conditioning system, and increases the endurance mileage. The external condenser 21 is a water-cooled condenser, and the use of the water-cooled condenser reduces the wind resistance of the external condenser 21 on the one hand, and on the other hand, the water-cooled condenser absorbs the heat in the heat pump cycle and releases the heat to the battery, so as to achieve the function of the heat pump heating the battery.

In this embodiment, the surface of the heat pump module is provided with a first heat exchange interface 201, a second heat exchange interface 202, a third heat exchange interface 203, a fourth heat exchange interface 204, a fifth heat exchange interface 205 and a sixth heat exchange interface 206.

An exhaust end of the compressor 10 is connected to the first heat exchange interface 201, the first heat exchange interface 201 is connected to a first end of the external condenser 21 through a first two-way valve 25, a second end of the external condenser 21 is connected to a first end of the first pipeline 241 of the coaxial tube 24 through a first one-way valve 26.

The first heat exchange interface 201 is further connected to the second heat exchange interface 202 through a second two-way valve 27, the second heat exchange interface 202 is connected to an inlet of the internal condenser 32, an outlet of the internal condenser 32 is connected to the third heat exchange interface 203, and the third heat exchange interface 203 is connected to the first end of the first pipeline 241 of the coaxial tube 24 through a second one-way valve 28.

That is, in this embodiment, the external condenser 21 and the internal condenser 32 are connected in parallel, so that in a passenger compartment refrigeration mode, the relevant loop of the internal condenser 32 may be closed to avoid the noise and heat radiation caused by refrigerant flowing into the internal condenser 32.

In this embodiment, a second end of the first pipeline 241 of the coaxial tube 24 is connected to the fourth heat exchange interface 204 through a first expansion valve 29, the fourth heat exchange interface 204 is connected to an inlet of the evaporator 31, an outlet of the evaporator 31 is connected to the fifth heat exchange interface 205, and the fifth heat exchange interface 205 is connected to a first end of the gas-liquid separator 23.

The second end of the first pipeline 241 of the coaxial tube 24 is further connected to a first end of the battery cooler 22 through a second expansion valve 210, and a second end of the battery cooler 22 is connected to the first end of the gas-liquid separator 23.

A second end of the gas-liquid separator 23 is connected to a second end of the second pipeline 242 of the coaxial tube 24, a first end of the second pipeline 242 of the coaxial tube 24 is connected to the sixth heat exchange interface 206, and the sixth heat exchange interface 206 is connected to a suction end of the compressor 10.

This embodiment achieves the circulation of refrigerant within the heat pump air conditioning system in the manner described above to meet different heat exchange requirements. When cooling the passenger compartment and dehumidifying the passenger compartment, the refrigerant flows into the evaporator 31 to achieve heat exchange; when heating the passenger compartment, the refrigerant flows into the internal condenser 32 to achieve heat exchange; when cooling the battery, the refrigerant flows into the battery cooler 22 to achieve heat exchange; when heating the battery, the refrigerant flows into the external condenser 21 to achieve heat exchange.

This embodiment also provides with multiple temperature sensors and pressure sensors to detect temperature and pressure within the heat pump air conditioning system. For example, a first temperature sensor 41 is provided on the main pipeline connecting in parallel between the external condenser 21 and the internal condenser 32, a second temperature sensor 42 is provided on the pipeline connecting to the outlet of the internal condenser 32, a third temperature sensor 43 is provided on the pipeline connecting to the outlet of the evaporator 31, and a fourth temperature sensor 44 is provided on the pipeline connecting to the second end of the gas-liquid separator 23; a first pressure sensor 51 is provided on the pipeline connecting to the second end of the gas-liquid separator 23; a second pressure sensor 52 is provided on the pipeline connecting to the first end of the coaxial tube 24.

Figure 3:
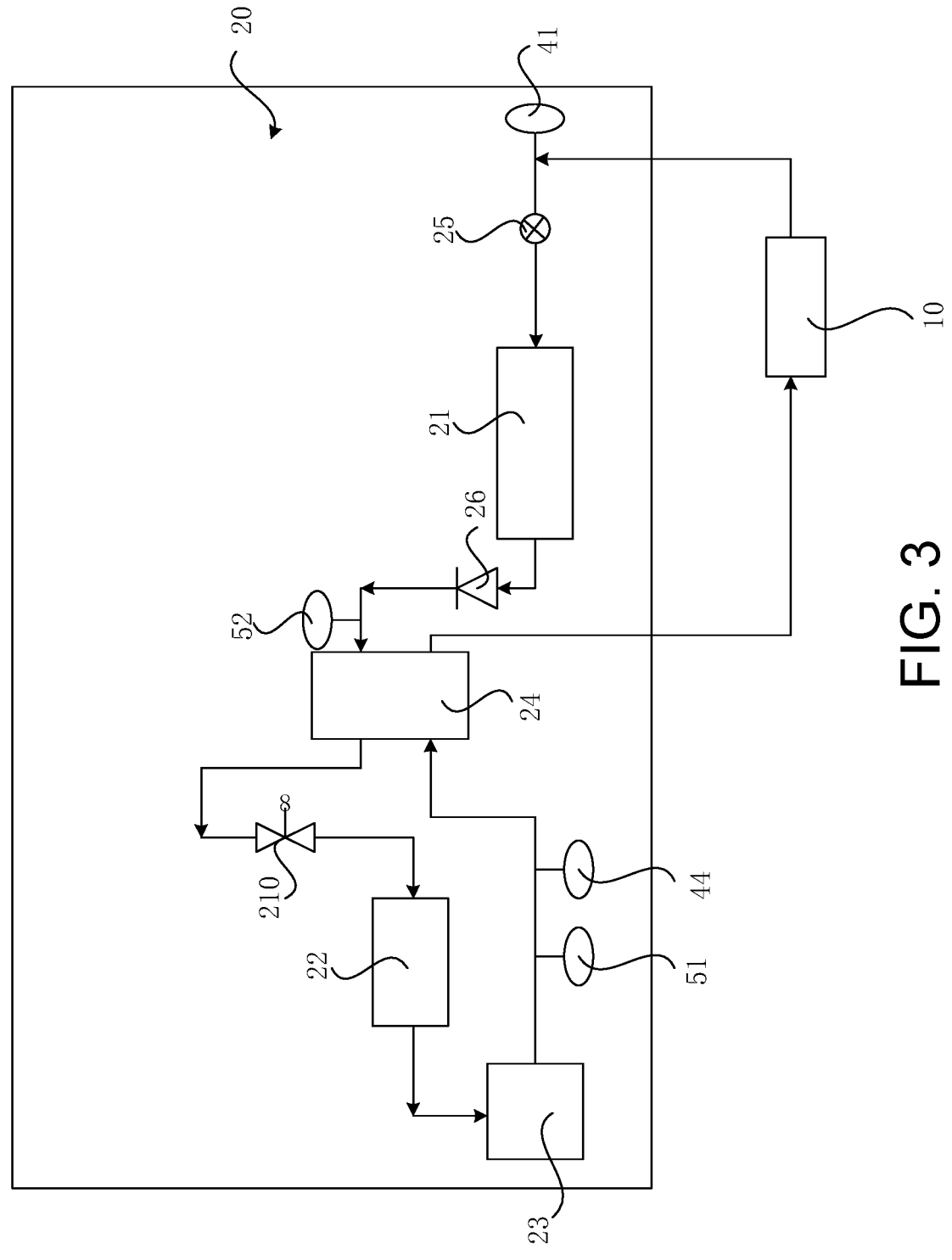
FIG. 3 is an equivalent structural simplified diagram of a heat pump air conditioning system in a first working state provided in an embodiment of the present application.

In an implementation, FIG. 3 is an equivalent structural simplified diagram of a heat pump air conditioning system in a first working state provided in an embodiment of the present application. Referring to FIG. 3, when the heat pump air conditioning system is in the first working state, refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26.

Refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the first working state, the function of cooling the battery or heating the battery can be achieved.

Figure 4:
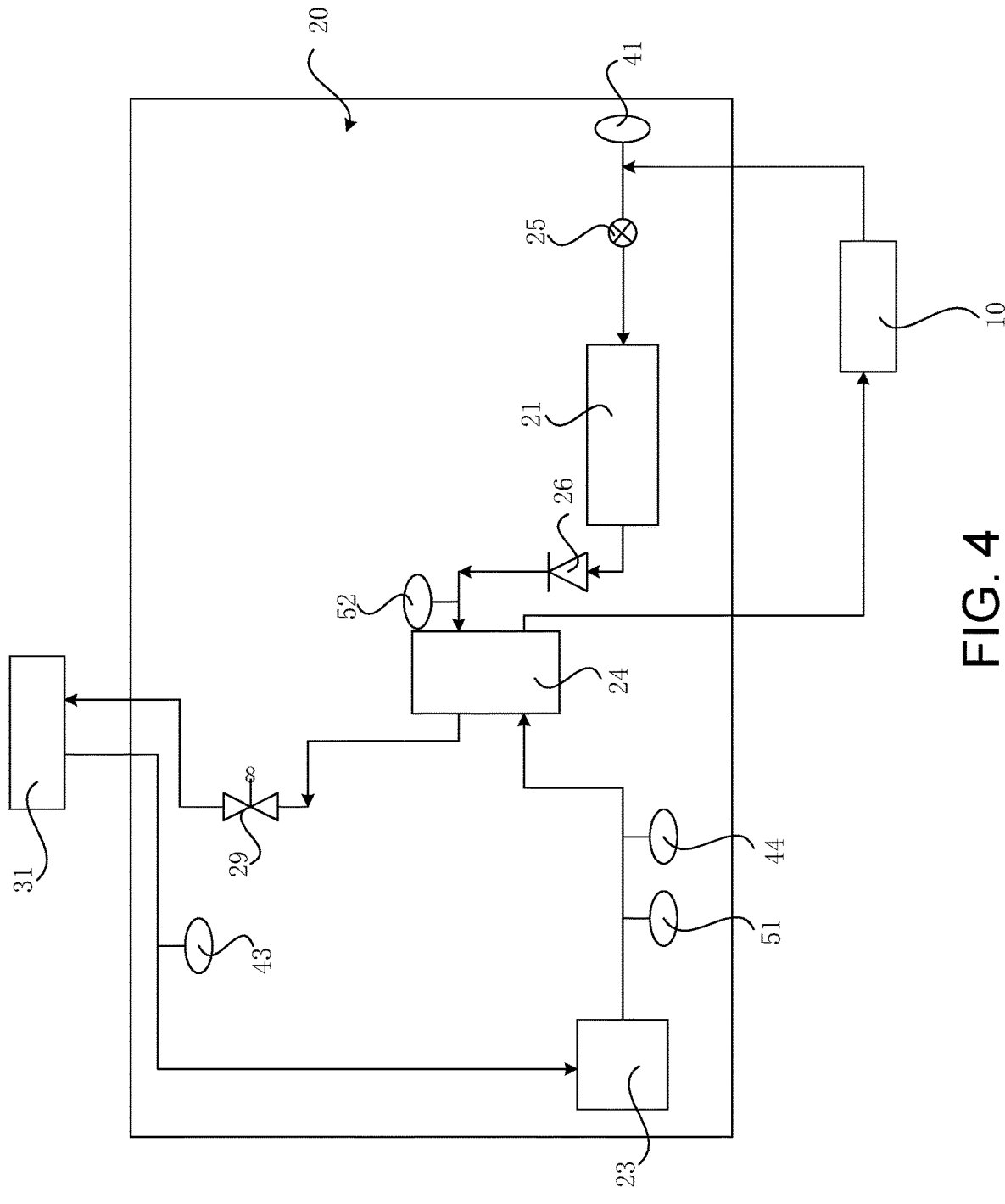
FIG. 4 is an equivalent structural simplified diagram of a heat pump air conditioning system in a second working state provided in an embodiment of the present application.

In an implementation, FIG. 4 is an equivalent structural simplified diagram of a heat pump air conditioning system in a second working state provided in an embodiment of the present application. Referring to FIG. 4, when the heat pump air conditioning system is in the second working state, refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26.

Refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the second working state, the function of cooling the battery and heating the battery can be achieved at the same time.

Figure 5:
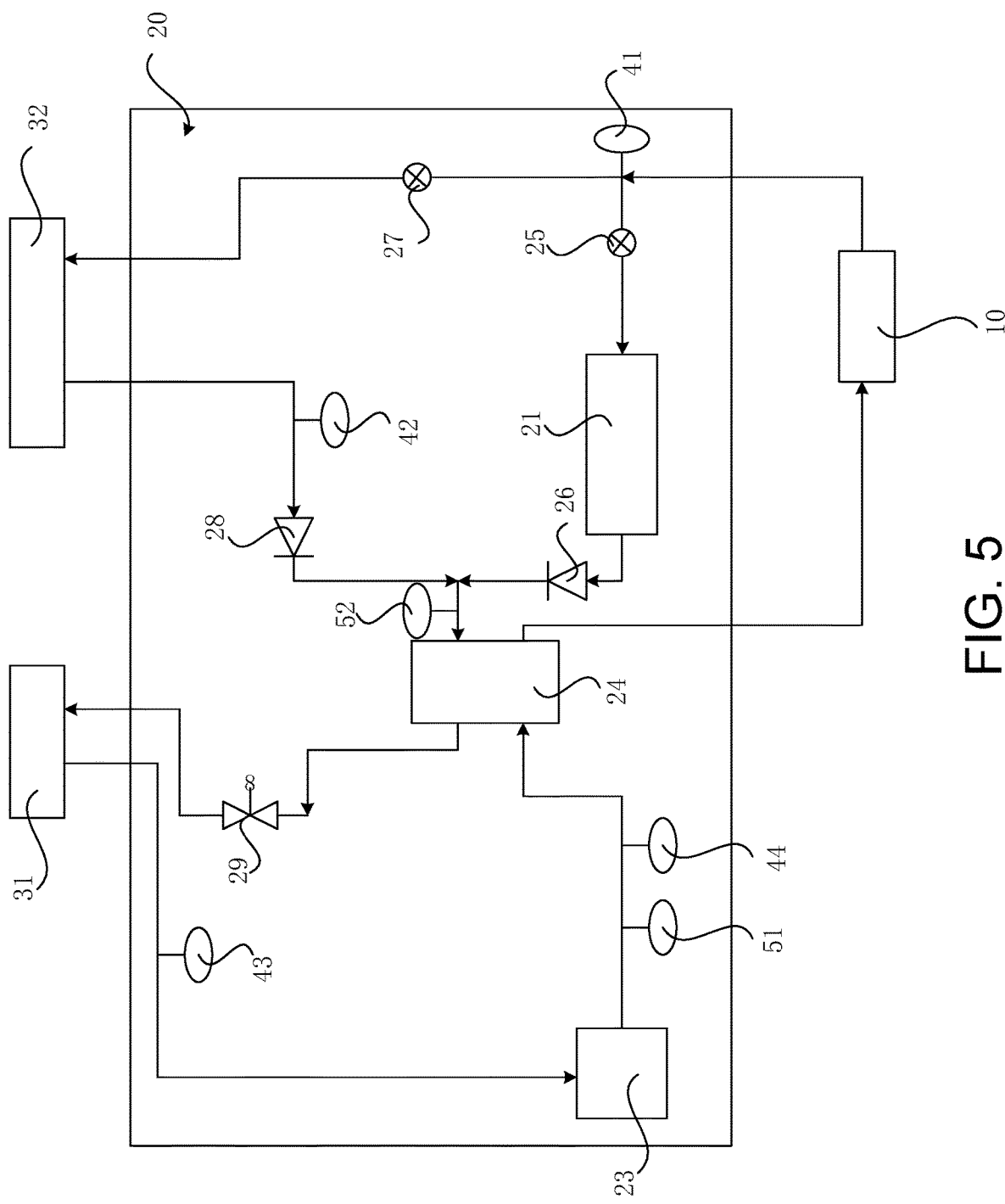
FIG. 5 is an equivalent structural simplified diagram of a heat pump air conditioning system in a third working state provided in an embodiment of the present application.

In an implementation, FIG. 5 is an equivalent structural simplified diagram of a heat pump air conditioning system in a third working state provided in an embodiment of the present application. Referring to FIG. 5, when the heat pump air conditioning system is in the third working state, a part of refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26; another part of refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

Refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the third working state, the function of heating the passenger compartment, dehumidifying the passenger compartment and heating the battery can be achieved.

Figure 6:
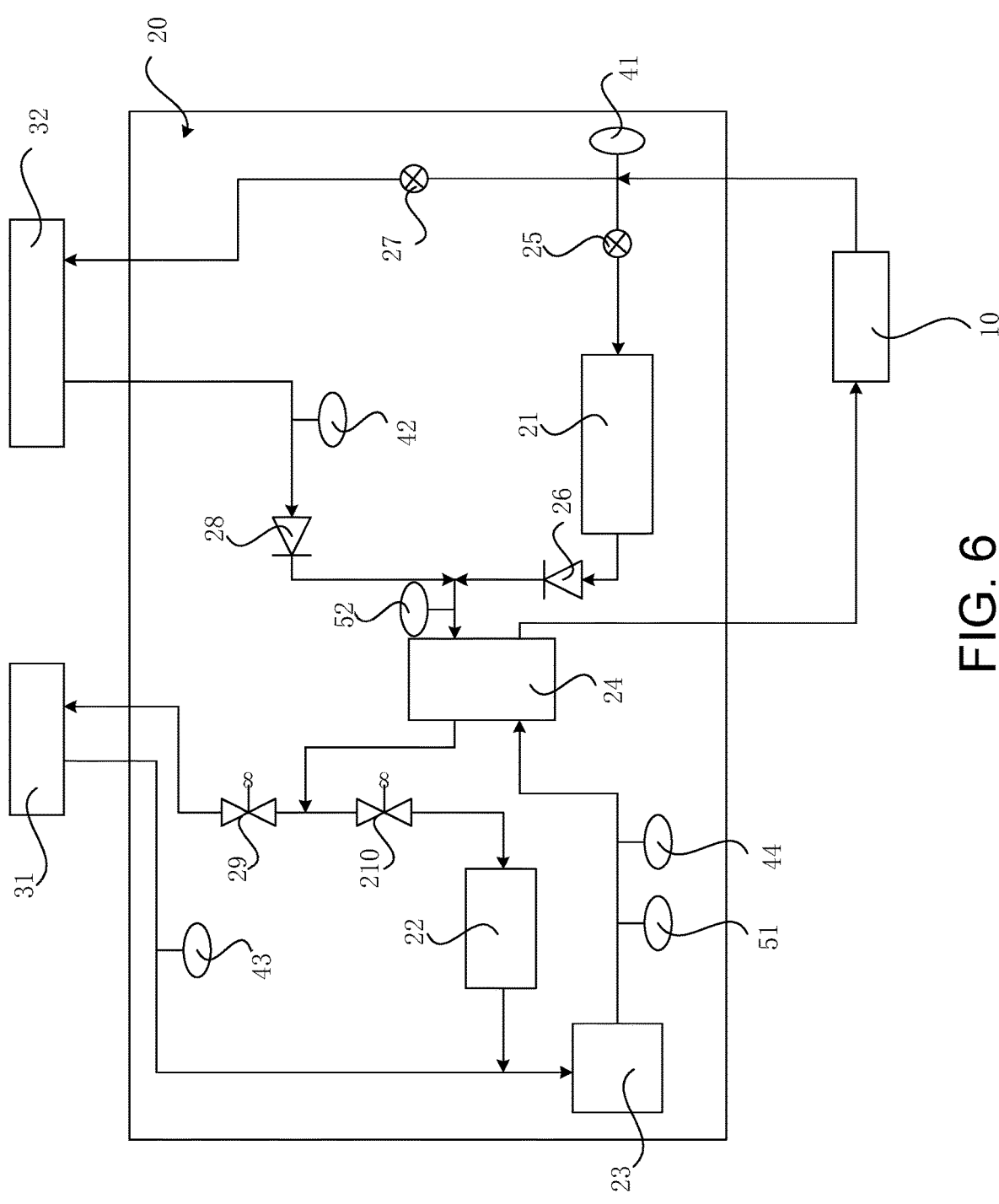
FIG. 6 is an equivalent structural simplified diagram of a heat pump air conditioning system in a fourth working state provided in an embodiment of the present application.

In an implementation, FIG. 6 is an equivalent structural simplified diagram of a heat pump air conditioning system in a fourth working state provided in an embodiment of the present application. Referring to FIG. 6, when the heat pump air conditioning system is in the fourth working state, a part of refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26; another part of refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

A part of refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23; another part of refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23.

Refrigerant flowing from the second end of the gas-liquid separator 23 flows into the second end of the second pipeline 242 of the coaxial tube 24, and flows into the suction end of the compressor 10 after passing through the first end of the second pipeline 242 of the coaxial tube 24.

When the heat pump air conditioning system of this embodiment is in the fourth working state, the function of heating the passenger compartment, dehumidifying the passenger compartment and cooling or heating the battery can be achieved.

Figure 7:
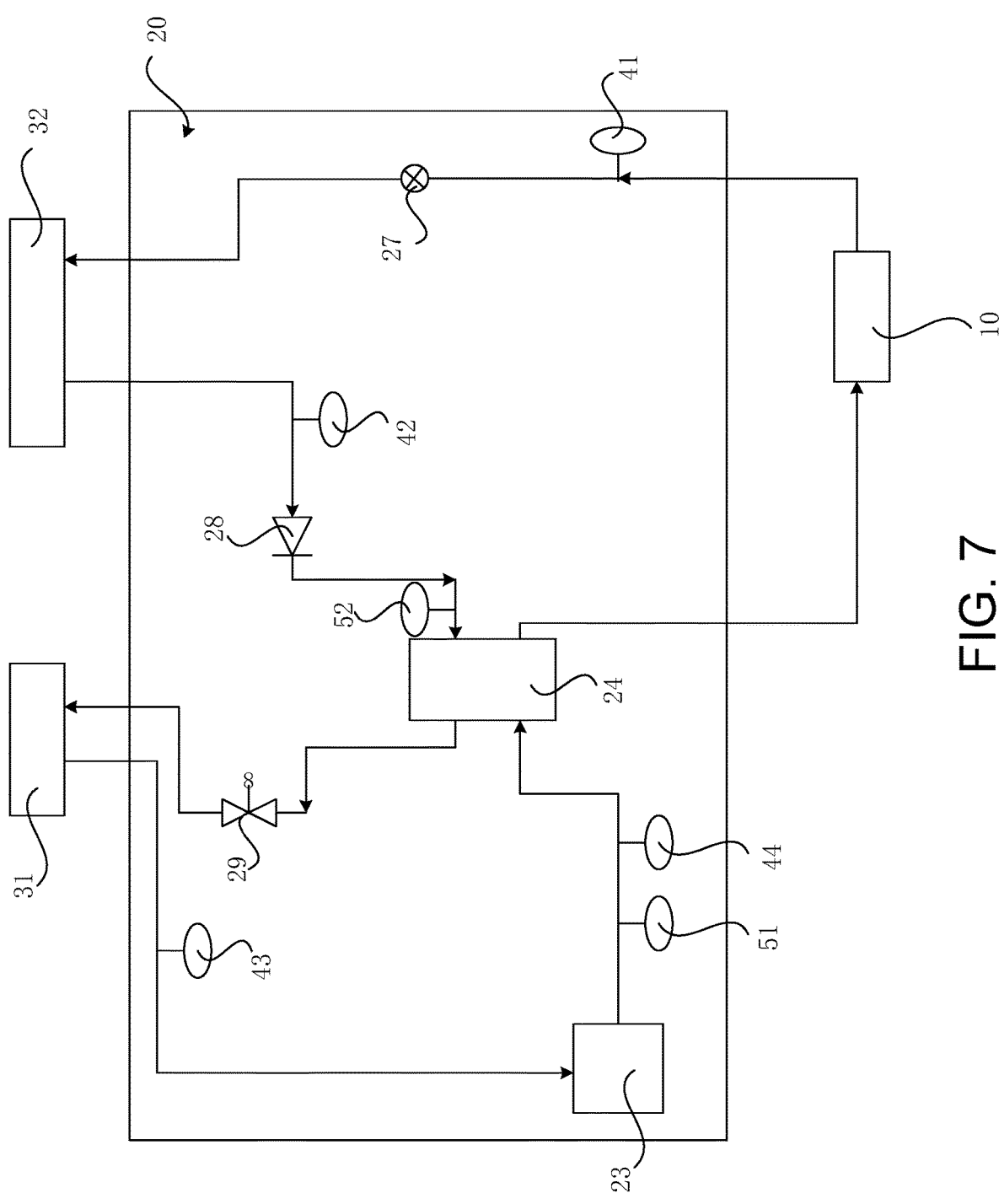
FIG. 7 is an equivalent structural simplified diagram of a heat pump air conditioning system in a fifth working state provided in an embodiment of the present application.

In an implementation, FIG. 7 is an equivalent structural simplified diagram of a heat pump air conditioning system in a fifth working state provided in an embodiment of the present application. Referring to FIG. 7, when the heat pump air conditioning system is in the fifth working state, refrigerant, refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

Refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the fifth working state, the function of heating the passenger compartment and dehumidifying the passenger compartment can be achieved.

Figure 8:
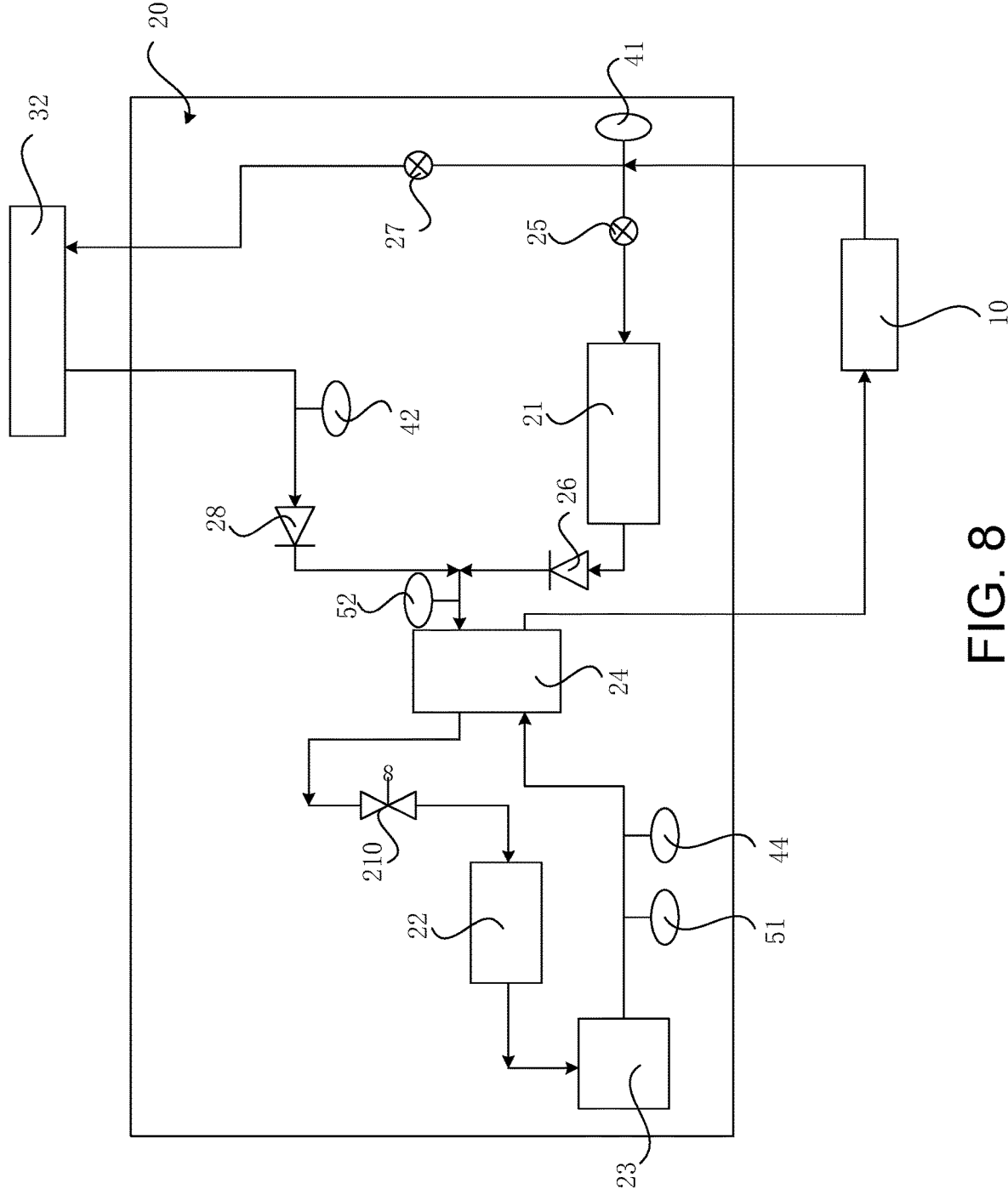
FIG. 8 is an equivalent structural simplified diagram of a heat pump air conditioning system in a sixth working state provided in an embodiment of the present application.

In an implementation, FIG. 8 is an equivalent structural simplified diagram of a heat pump air conditioning system in a sixth working state provided in an embodiment of the present application. Referring to FIG. 8, when the heat pump air conditioning system is in the sixth working state, a part of refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26; another part of refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

Refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the sixth working state, the function of heating the passenger compartment, and cooling or heating the battery can be achieved.

Figure 9:
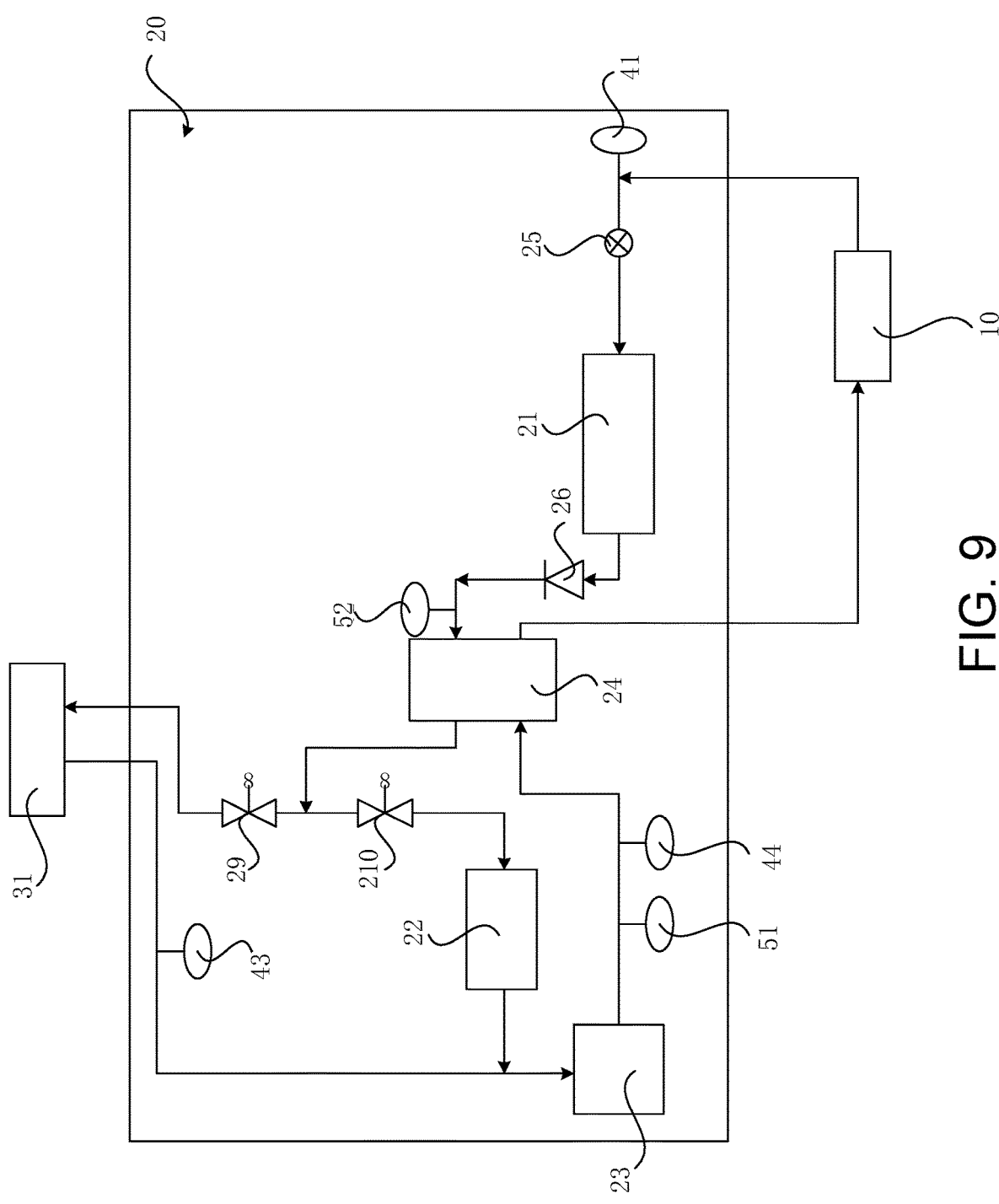
FIG. 9 is an equivalent structural simplified diagram of a heat pump air conditioning system in a seventh working state provided in an embodiment of the present application.

In an implementation, FIG. 9 is an equivalent structural simplified diagram of a heat pump air conditioning system in a seventh working state provided in an embodiment of the present application. Referring to FIG. 9, when the heat pump air conditioning system is in the seventh working state, refrigerant flows from the exhaust end of the compressor 10 through the first two-way valve 25 into the first end of the external condenser 21, and refrigerant flowing from the second end of the external condenser 21 flows into the first end of the first pipeline 241 of the coaxial tube 24 through the first one-way valve 26.

A part of refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23; another part of refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23.

Refrigerant flowing from the second end of the gas-liquid separator 23 flows into the second end of the second pipeline 242 of the coaxial tube 24, and flows into the suction end of the compressor 10 after passing through the first end of the second pipeline 242 of the coaxial tube 24.

When the heat pump air conditioning system of this embodiment is in the seventh working state, the function of cooling the passenger compartment, and cooling or heating the battery can be achieved.

Figure 10:
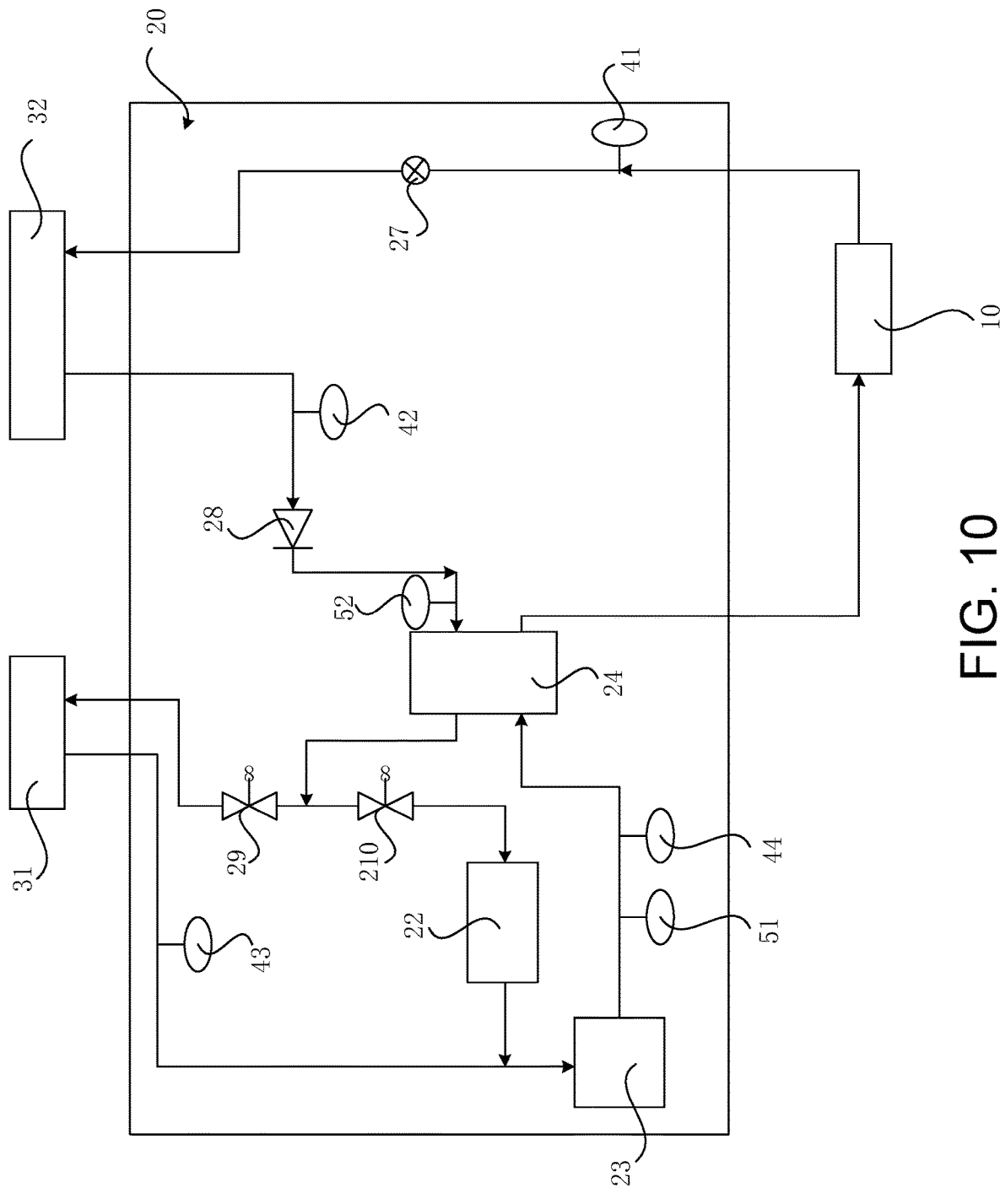
FIG. 10 is an equivalent structural simplified diagram of a heat pump air conditioning system in an eighth working state provided in an embodiment of the present application.

In an implementation, FIG. 10 is an equivalent structural simplified diagram of a heat pump air conditioning system in an eighth working state provided in an embodiment of the present application. Referring to FIG. 10, when the heat pump air conditioning system is in the eighth working state, refrigerant, refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

A part of refrigerant flowing from the second end of the first pipeline 241 of the coaxial tube 24 flows into the inlet of the evaporator 31 through the first expansion valve 29, and refrigerant flowing from the outlet of the evaporator 31 flows into the first end of the gas-liquid separator 23; another part of refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23.

Refrigerant flowing from the second end of the gas-liquid separator 23 flows into the second end of the second pipeline 242 of the coaxial tube 24, and flows into the suction end of the compressor 10 after passing through the first end of the second pipeline 242 of the coaxial tube 24.

When the heat pump air conditioning system of this embodiment is in the eighth working state, the function of heating the passenger compartment, dehumidifying the passenger compartment and cooling the battery can be achieved.

Figure 11:
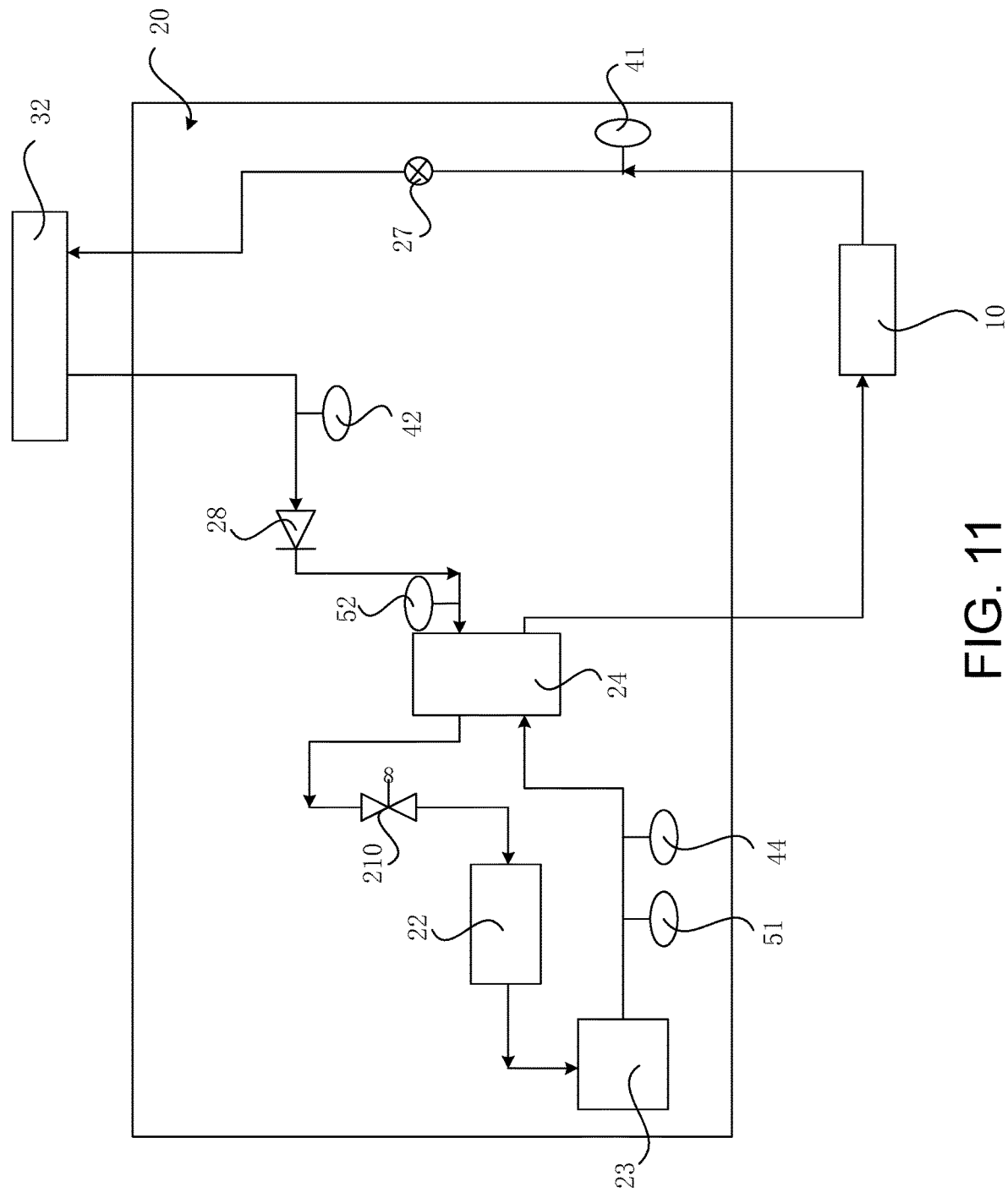
FIG. 11 is an equivalent structural simplified diagram of a heat pump air conditioning system in a ninth working state provided in an embodiment of the present application.

In an implementation, FIG. 11 is an equivalent structural simplified diagram of a heat pump air conditioning system in a ninth working state provided in an embodiment of the present application. Referring to FIG. 11, when the heat pump air conditioning system is in the ninth working state, refrigerant, refrigerant flows from the exhaust end of the compressor 10 through the second two-way valve 27 into the inlet of the internal condenser 32, and refrigerant flowing from the outlet of the internal condenser 32 flows into the first end of the first pipeline 241 of the coaxial tube 24 through the second one-way valve 28.

Refrigerant flowing from the second end of the first pipeline 241 of the coaxial tube 24 flows into the first end of the battery cooler 22 through the second expansion valve 210, and refrigerant flowing from the second end of the battery cooler 22 flows into the first end of the gas-liquid separator 23, flows into the second end of the second pipeline 242 of the coaxial tube 24 from the second end of the gas-liquid separator 23, and flows into the suction end of the compressor 10 after passing through the first end of the second pipeline 242 of the coaxial tube 24.

When the heat pump air conditioning system of this embodiment is in the ninth working state, the function of heating the passenger compartment and cooling the battery can be achieved at the same time.

Embodiment 2

This embodiment provides a vehicle, including the heat pump air conditioning system as described in Embodiment 1 above.

As the vehicle of the embodiment adopts the heat pump air conditioning system of the above described Embodiment 1, thus achieving the modularity of the heat pump air conditioning system, and making the interfaces within the heat pump air conditioning system uniform, which is conducive to reducing the difficulty in installing and arranging the heat pump air conditioning system.

In the description of the present application, it should be understood that the terms "center", "longitudinal". "lateral", "length", "width", "thickness", "up", "down", "front", "back", "left", "right", "vertical", "horizontal", "top", "bottom", "inside", "outside", "clockwise", "counterclockwise", "axial", "radial", etc. indicate orientation or positional relationships are based on those shown in the accompanying drawings, which are intended only to facilitate the description of the present application and to simplify the description, and are not intended to indicate or imply that the apparatus or element referred to must have a particular orientation, be constructed and operated in a particular orientation, and therefore cannot be construed as a limitation of the present application.

In the present application, unless otherwise expressly specified and limited, the terms "mounted", "conjoint", "connected", "fixed", etc. are to be understood in a broad sense, for example, which may be a fixed connection, may also be a removable connection or an integrate; may be a direct connection, may also be an indirect connection through an intermediate medium, may also be a connection within two elements, or an interaction relationship between two elements. For persons with ordinary skill in the art, the specific meanings of the above terms in the present application can be understood based on a specific circumstance.

It should be noted that in the description of the present application, the terms "first" and "second" are only used to facilitate the description of different components, and cannot be understood as indicating or implying sequential relationships, relative importance, or implying the number of indicated technical features. Therefore, features defined with "first" and "second" can explicitly or implicitly include at least one of these features.

In the present application, each embodiment or implementation method is described in a progressive manner, and each embodiment focuses on the differences from other embodiments, the same and similar parts between each embodiment can be referred to each other.

In the description of the present application, the reference terms "an embodiment", "some embodiments", "illustrative embodiment", "example", "specific example", or "some examples" refer to the specific features, structures, materials, or characteristics described in combination with the embodiment or example included in at least one embodiments or examples of the present application. In the present application, the schematic expressions of the above terms may not necessarily refer to the same embodiments or examples. Moreover, the specific features, structures, materials, or characteristics described can be combined in an appropriate manner in any one or more embodiments or examples.

Finally, it should be noted that the above embodiments are only used to illustrate the technical solutions of the present application and not to limit it; although the present application has been described in detail with reference to the aforementioned embodiments, person with ordinary skill in the art should understand that they can still modify the technical solutions recorded in the aforementioned embodiments, or equivalently replace some or all of the technical features; and these modifications or replacements do not make the essence of the corresponding technical solutions deviate from the scope of the technical solutions of the various embodiments of the present application.

What is claimed is:

1. A heat pump air conditioning system, comprising a compressor, a heat pump module, and an air conditioning unit, wherein the air conditioning unit comprises an evaporator and an internal condenser, the heat pump module comprises multiple air conditioning components, and a surface of the heat pump module is provided with multiple heat exchange interfaces connected to the air conditioning components, and the compressor, the evaporator, or the internal condenser is connected to the heat pump module through one of the multiple heat exchange interfaces;

wherein the air conditioning components comprise a coaxial tube, and comprise at least one of an external condenser, a battery cooler, a gas-liquid separator, an expansion valve, a one-way valve and a two-way valve, the coaxial tube comprises a first pipeline and a second pipeline set in a coaxial position, and the external condenser is a water-cooled condenser; and the surface of the heat pump module is provided with a first heat exchange interface, a second heat exchange interface, a third heat exchange interface, a fourth heat exchange interface, a fifth heat exchange interface and a sixth heat exchange interface;

an exhaust end of the compressor is connected to the first heat exchange interface, the first heat exchange interface is connected to a first end of the external condenser through a first two-way valve, a second end of the external condenser is connected to a first end of the first pipeline of the coaxial tube through a first one-way valve;

the first heat exchange interface is further connected to the second heat exchange interface through a second two-way valve, the second heat exchange interface is connected to an inlet of the internal condenser, an outlet of the internal condenser is connected to the third heat exchange interface, and the third heat exchange interface is connected to the first end of the first pipeline of the coaxial tube through a second one-way valve;

a second end of the first pipeline of the coaxial tube is connected to the fourth heat exchange interface through a first expansion valve, the fourth heat exchange interface is connected to an inlet of the evaporator, an outlet of the evaporator is connected to the fifth heat exchange interface, and the fifth heat exchange interface is connected to a first end of the gas-liquid separator;

the second end of the first pipeline of the coaxial tube is further connected to a first end of the battery cooler through a second expansion valve, and a second end of the battery cooler is connected to the first end of the gas-liquid separator;

a second end of the gas-liquid separator is connected to a second end of the second pipeline of the coaxial tube, a first end of the second pipeline of the coaxial tube is connected to the sixth heat exchange interface, and the sixth heat exchange interface is connected to a suction end of the compressor.

2. The heat pump air conditioning system according to claim 1, wherein when the heat pump air conditioning system is in a first working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

3. The heat pump air conditioning system according to claim 1, wherein when the heat pump air conditioning system is in a second working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

4. The heat pump air conditioning system according to claim 1, wherein when the heat pump air conditioning system is in a third working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

5. The heat pump air conditioning system according to claim 1, wherein when the heat pump air conditioning system is in a fourth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

6. The heat pump air conditioning system according to claim 1, wherein when the heat pump air conditioning system is in a fifth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

7. The heat pump air conditioning system according to claim 1, wherein when the heat pump air conditioning system is in a sixth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

8. The heat pump air conditioning system according to claim 1, wherein when the heat pump air conditioning system is in a seventh working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

9. The heat pump air conditioning system according to claim 1, wherein when the heat pump air conditioning system is in an eighth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

10. The heat pump air conditioning system according to claim 1, wherein when the heat pump air conditioning system is in a ninth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

11. A vehicle, comprising a heat pump air conditioning system, the heat pump air conditioning system comprises a compressor, a heat pump module, and an air conditioning unit, wherein the air conditioning unit comprises an evaporator and an internal condenser, the heat pump module comprises multiple air conditioning components, and a surface of the heat pump module is provided with multiple heat exchange interfaces connected to the air conditioning components, and the compressor, the evaporator, or the internal condenser is connected to the heat pump module through one of the multiple heat exchange interfaces;

wherein the air conditioning components comprise a coaxial tube, and comprise at least one of an external condenser, a battery cooler, a gas-liquid separator, an expansion valve, a one-way valve and a two-way valve, the coaxial tube comprises a first pipeline and a second pipeline set in a coaxial position, and the external condenser is a water-cooled condenser; and the surface of the heat pump module is provided with a first heat exchange interface, a second heat exchange interface, a third heat exchange interface, a fourth heat exchange interface, a fifth heat exchange interface and a sixth heat exchange interface;

an exhaust end of the compressor is connected to the first heat exchange interface, the first heat exchange interface is connected to a first end of the external condenser through a first two-way valve, a second end of the external condenser is connected to a first end of the first pipeline of the coaxial tube through a first one-way valve;

the first heat exchange interface is further connected to the second heat exchange interface through a second two-way valve, the second heat exchange interface is connected to an inlet of the internal condenser, an outlet of the internal condenser is connected to the third heat exchange interface, and the third heat exchange interface is connected to the first end of the first pipeline of the coaxial tube through a second one-way valve;

a second end of the first pipeline of the coaxial tube is connected to the fourth heat exchange interface through a first expansion valve, the fourth heat exchange interface is connected to an inlet of the evaporator, an outlet of the evaporator is connected to the fifth heat exchange interface, and the fifth heat exchange interface is connected to a first end of the gas-liquid separator;

the second end of the first pipeline of the coaxial tube is further connected to a first end of the battery cooler through a second expansion valve, and a second end of the battery cooler is connected to the first end of the gas-liquid separator;

a second end of the gas-liquid separator is connected to a second end of the second pipeline of the coaxial tube, a first end of the second pipeline of the coaxial tube is connected to the sixth heat exchange interface, and the sixth heat exchange interface is connected to a suction end of the compressor.

12. The vehicle according to claim 11, wherein when the heat pump air conditioning system is in a first working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

13. The vehicle according to claim 11, wherein when the heat pump air conditioning system is in a second working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

14. The vehicle according to claim 11, wherein when the heat pump air conditioning system is in a third working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

15. The vehicle according to claim 11, wherein when the heat pump air conditioning system is in a fourth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

16. The vehicle according to claim 11, wherein when the heat pump air conditioning system is in a fifth working state, refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the inlet of the evaporator through the first expansion valve, and refrigerant flowing from the outlet of the evaporator flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

17. The vehicle according to claim 11, wherein when the heat pump air conditioning system is in a sixth working state, a part of refrigerant flows from the exhaust end of the compressor through the first two-way valve into the first end of the external condenser, and refrigerant flowing from the second end of the external condenser flows into the first end of the first pipeline of the coaxial tube through the first one-way valve; another part of refrigerant flows from the exhaust end of the compressor through the second two-way valve into the inlet of the internal condenser, and refrigerant flowing from the outlet of the internal condenser flows into the first end of the first pipeline of the coaxial tube through the second one-way valve;

refrigerant flowing from the second end of the first pipeline of the coaxial tube flows into the first end of the battery cooler through the second expansion valve, and refrigerant flowing from the second end of the battery cooler flows into the first end of the gas-liquid separator, flows into the second end of the second pipeline of the coaxial tube from the second end of the gas-liquid separator, and flows into the suction end of the compressor after passing through the first end of the second pipeline of the coaxial tube.

18. The vehicle according to claim 11, wherein when the heat pump air conditioning system is in a seventh working state, refrigerant flows from the exhaust end of the compressor through the first two-way valve into the first end of the external condenser, and refrigerant flowing from the second end of the external condenser flows into the first end of the first pipeline of the coaxial tube through the first one-way valve;

a part of refrigerant flowing from the second end of the first pipeline of the coaxial tube flows into the inlet of the evaporator through the first expansion valve, and refrigerant flowing from the outlet of the evaporator flows into the first end of the gas-liquid separator; another part of refrigerant flowing from the second end of the first pipeline of the coaxial tube flows into the first end of the battery cooler through the second expansion valve, and refrigerant flowing from the second end of the battery cooler flows into the first end of the gas-liquid separator;

refrigerant flowing from the second end of the gas-liquid separator flows into the second end of the second pipeline of the coaxial tube, and flows into the suction end of the compressor after passing through the first end of the second pipeline of the coaxial tube.

* * * * *